United States Patent
Toma et al.

(10) Patent No.: US 10,362,286 B2
(45) Date of Patent: *Jul. 23, 2019

(54) METHOD FOR CONVERTING LUMINANCE RANGE OF PICTURE SIGNAL

(71) Applicant: Panasonic Intellectual Property Management Co., Ltd., Osaka (JP)

(72) Inventors: Tadamasa Toma, Osaka (JP); Masayuki Kozuka, Osaka (JP); Takahiro Nishi, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/943,052

(22) Filed: Apr. 2, 2018

(65) Prior Publication Data

US 2018/0227561 A1   Aug. 9, 2018

Related U.S. Application Data

(63) Continuation of application No. 15/284,594, filed on Oct. 4, 2016, now Pat. No. 9,967,533, which is a continuation of application No. PCT/JP2015/002220, filed on Apr. 24, 2015.

(30) Foreign Application Priority Data

Apr. 15, 2015   (JP) .................................. 2015-083765

(51) Int. Cl.
*H04N 5/20*   (2006.01)
*H04N 9/77*   (2006.01)
(Continued)

(52) U.S. Cl.
CPC .............. *H04N 9/77* (2013.01); *G09G 5/003* (2013.01); *G09G 5/10* (2013.01); *H04N 5/20* (2013.01);
(Continued)

(58) Field of Classification Search
CPC ...................................................... H04N 5/20
See application file for complete search history.

(56) References Cited

U.S. PATENT DOCUMENTS 9,626,744 B2    4/2017  Finlayson
9,762,843 B2 *  9/2017  Terada ..................... G09G 5/10
(Continued)

FOREIGN PATENT DOCUMENTS

CN    103430212    12/2013
JP    2008-167418   7/2008
(Continued)

OTHER PUBLICATIONS

International Search Report of PCT application No. PCT/JP2015/002220 dated Jul. 7, 2015.
(Continued)

*Primary Examiner* — Paulos M Natnael
(74) *Attorney, Agent, or Firm* — Wenderoth, Lind & Ponack, L.L.P.

(57) ABSTRACT

In a converting method relating to picture luminance according to one aspect of the present disclosure, the picture luminance is formed by luminance values in a first luminance range. In this method, a first luminance signal that indicates code values obtained by quantizing the luminance value of the picture is obtained, code values, which are associated with the code values indicated by the obtained first luminance signal by quantization for a second luminance range different in a maximum value from the first luminance range are determined as converted code values, and the first luminance signal is converted into a second luminance signal indicating the converted code values. As a result, the converting method is further improved.

10 Claims, 14 Drawing Sheets

Related U.S. Application Data

(60) Provisional application No. 61/994,411, filed on May 16, 2014.

(51) Int. Cl.
| | | |
|---|---|---|
| *H04N 5/202* | (2006.01) | |
| *H04N 5/235* | (2006.01) | |
| *H04N 9/68* | (2006.01) | |
| *G09G 5/00* | (2006.01) | |
| *G09G 5/10* | (2006.01) | |

(52) U.S. Cl.
CPC .......... *H04N 5/202* (2013.01); *H04N 5/2355* (2013.01); *H04N 9/68* (2013.01); *G09G 2320/0271* (2013.01); *G09G 2340/06* (2013.01); *G09G 2360/16* (2013.01); *G09G 2370/12* (2013.01)

(56) References Cited

U.S. PATENT DOCUMENTS

| | | | | |
|---|---|---|---|---|
| 9,967,533 B2* | 5/2018 | Toma | ........................ | G09G 5/10 |
| 9,973,724 B2* | 5/2018 | Terada | ...................... | G09G 5/10 |
| 10,033,958 B2* | 7/2018 | Terada | ...................... | G09G 5/10 |
| 2014/0002479 A1* | 1/2014 | Muijs | ........................ | G06T 5/50 |
| | | | | 345/589 |
| 2014/0210847 A1* | 7/2014 | Knibbeler | .............. | G09G 5/006 |
| | | | | 345/589 |
| 2015/0103919 A1* | 4/2015 | Hattori | ................. | H04N 19/124 |
| | | | | 375/240.25 |
| 2016/0292834 A1* | 10/2016 | Tsuru | ...................... | G06T 5/009 |
| 2016/0373712 A1* | 12/2016 | Yamamoto | ............. | G11B 20/10 |
| 2017/0264859 A1* | 9/2017 | Drugeon | .............. | H04N 7/0117 |

FOREIGN PATENT DOCUMENTS

| | | |
|---|---|---|
| WO | 2013/046095 | 4/2013 |
| WO | 2015/005189 | 1/2015 |

OTHER PUBLICATIONS

The Extended European Search Report dated Mar. 7, 2017 for the related European Patent Application No. 15792648.6.

English translation of Search Report dated Dec. 26, 2018 in corresponding Chinese Patent Application No. 201580011860.8.

* cited by examiner

FIG. 10

| GRAPHIC MASTER | | VIDEO MASTER | |
|---|---|---|---|
| | | HDR | SDR |
| | SDR | ✓ | ✓ |
| | HDR | ✓ | ✓ |

FIG. 11

| GRAPHIC MASTER | | VIDEO MASTER | |
|---|---|---|---|
| | | HDR | SDR |
| | COMMON BETWEEN SDR AND HDR | ✓ | ✓ |

METHOD FOR CONVERTING LUMINANCE RANGE OF PICTURE SIGNAL

BACKGROUND

1. Technical Field

The present disclosure relates to a converting method and a converting apparatus that perform a conversion into a signal in a different luminance range.

2. Description of the Related Art

Conventionally, an image signal processing apparatus for improving a displayable luminance level has been disclosed (for example, see Unexamined Japanese Patent Publication No. 2008-167418).

SUMMARY

In one general aspect, the techniques disclosed here feature a method including obtaining a first luminance signal that indicates a first code value obtained by quantizing a luminance value of a picture, luminance of the picture being formed by a luminance value in a first luminance range, and converting the first luminance signal into a second luminance signal indicating a converted code value by deciding, as the converted code value, a second code value, which is associated with the first code value indicated by the obtained first luminance signal, the second code value being for a second luminance range different in a maximum value from the first luminance range.

The above aspect can realize further improvement.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

It should be noted that general or specific embodiments may be implemented as a system, a method, an integrated circuit, a computer program, a storage medium, or any selective combination thereof.

BRIEF DESCRIPTION OF THE DRAWINGS

FIG. 10 is a diagram illustrating an example of combinations of the HDR and the SDR when contents include one video stream and one graphic stream;

FIG. 11 is a diagram illustrating that a graphic master is created by using the EOTF shared by a video master;

DETAILED DESCRIPTION

Figure 1:
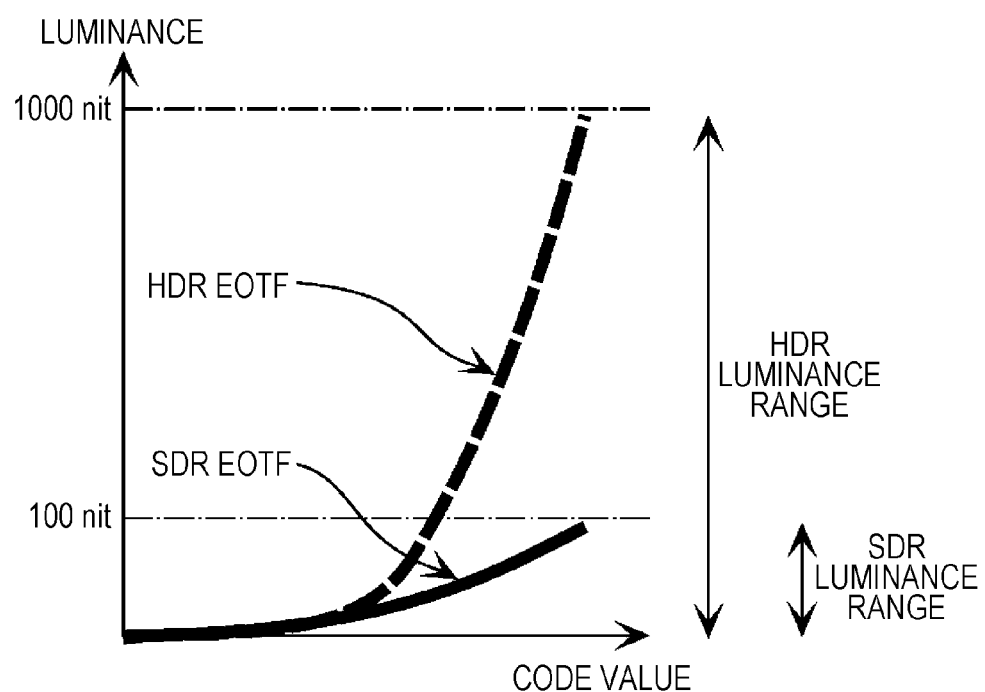
FIG. 1 is a diagram illustrating an example of an EOTF (Electro-Optical Transfer Function)

Underlying Knowledge Forming Basis of the Present Disclosure

The inventor of the present disclosure has found that an image signal processing apparatus described in "Background Art" has the following problem.

In the image signal processing apparatus disclosed in Unexamined Japanese Patent Publication No. 2008-167418, linear luminance is calculated for respective pixels based on linear RGB values calculated from the respective pixels forming an object, correction linear luminance for the respective pixels and a correction linear RGB value of a synthesized pixel obtained by synthesizing a plurality of pixels including the respective pixels are calculated based on the linear RGB value and the linear luminance, and the correction linear luminance and the correction linear RGB value are gamma-corrected so that display luminance and a display RGB value are calculated. In such a manner, in the image signal processing apparatus, the linear luminance is corrected based on the correction linear RGB value so that displayable gradation is increased.

However, in correction (conversion) of luminance of the image signal processing apparatus disclosed in Unexamined Japanese Patent Publication No. 2008-167418, a luminance converting method at a time of correcting (converting) the luminance from a first luminance range into a second luminance range larger or smaller than the first luminance range is not considered.

In view of the above, the inventor of present disclosure has been examined the following improvement plan in order to solve the above problem.

A converting method according to one aspect of the present disclosure is a converting method relating to picture luminance, the picture luminance being formed by a luminance value in a first luminance range, the method includes, obtaining a first luminance signal that indicates a code value obtained by quantizing the luminance value of the picture, deciding a code value, which is associated with the code value indicated by the obtained first luminance signal by quantization for a second luminance range different in a maximum value from the first luminance range, as a converted code value, and converting the first luminance signal is converted into a second luminance signal indicating the converted code value.

As a result, the luminance can be suitably converted from the first luminance range into the second luminance range larger or smaller than the first luminance range.

Further, for example, the first luminance signal indicates the first code value obtained by quantizing the picture luminance value using a first EOTF (Electro-Optical Transfer Function) where the luminance value in the first luminance range and a plurality of first code values are associated with each other. In conversion into the second luminance signal, the second code value associated with the code value indicated by the obtained first luminance signal is decided as the converted code value by using the first EOTF and a second EOTF where the luminance value in the second luminance range and a plurality of second code values are associated with each other, and the second luminance signal may indicate the decided second code value.

Further, for example, in the conversion into the second luminance signal, first remapping for (i) deciding a luminance value associated with the code value indicated by the first luminance signal using the first EOTF, and (ii) deciding the second code value associated with the decided luminance value in the second EOTF as the converted code value, may be performed.

Further, for example, in the first remapping, when the plurality of second code values does not include the code value that is associated with the decided luminance value in the second EOTF, a code value associated with a luminance value least different from the decided luminance value in the plurality of second code values may be decided as the converted code value.

Further, for example, in the first remapping, when the code value indicated by the obtained first luminance signal is a second bit number smaller than a first bit number expressing the first code value associated in the first EOTF, a luminance value associated in the first EOTF may be decided by using a bit higher by the second bit number in the first code value.

Further, for example, in conversion into the second luminance signal, second remapping for (i) deciding a first luminance value associated with the code value indicated by the first luminance signal using the first EOTF, (ii) deciding a second luminance value associated with the decided first luminance value in advance in the second luminance range, and (iii) deciding the second code value associated with the decided second luminance value in the second EOTF as the converted code value, may be performed.

Further, for example, the first luminance range is larger in a maximum luminance value than the second luminance range, the maximum luminance value in the first luminance range is associated with the maximum luminance value in the second luminance range in advance, in decision of the second luminance value, when the decided first luminance value is in a low luminance region where the luminance is low in the first luminance range, the second luminance value is decided so as to be approximately equal to the first luminance value, when the decided first luminance value is in a high luminance region where the luminance is high in the first luminance range, the second luminance value is decided so that the larger the first luminance value is, the smaller an increase amount of the luminance value is, when the decided first luminance value is the maximum luminance value in the first luminance range, the maximum luminance value in the second luminance range may be the second luminance value.

Further, for example, in decision of the second luminance value, when the decided first luminance value exceeds the maximum luminance value in the second luminance range, the maximum luminance value in the second luminance range may be the second luminance value.

Further, for example, in decision of the second luminance value, relational information according to a scene of the picture is selected from a plurality of pieces of relational information representing relationships between the luminance value in the first luminance range and the luminance value in the second luminance range, and the second luminance value may be decided based on the decided first luminance value by using the selected relational information.

Further, for example, in conversion into the second luminance signal, when the picture is a video and the first luminance signal is a signal obtained by quantizing a luminance value of the video, second remapping for (i) deciding a first luminance value associated with the code value indicated by the first luminance signal using the first EOTF, (ii) deciding a second luminance value associated with the decided first luminance value in advance in the second luminance range, and (iii) deciding a code value associated with the decided second luminance value in the second EOTF as the converted code value, is performed, when the picture is a graphic and the first luminance signal is a signal obtained by quantizing a luminance value of the graphic, first remapping for (i) deciding a luminance value associated with the code value indicated by the first luminance signal using the first EOTF, and (ii) deciding a code value associated with the decided luminance value in the second EOTF as the converted code value, may be performed.

Further, for example, the method further includes performing the first remapping and the second remapping so that a video and a graphic that are converted into the second luminance signal may be synthesized to be output.

Further, for example, the conversion into the second luminance signal may be performed by using the first EOTF and the second EOTF where a displayable luminance range on a display device as an output destination of the second luminance signal is the second luminance range.

Further, for example, the method further includes outputting the second luminance signal obtained by converting the obtained first luminance signal together with meta-information for identifying the second EOTF.

Note that these generic or specific aspects may be realized by an apparatus, a system, an integrated circuit, a computer program or a recording medium recording medium such as a CD-ROM readable by a computer, or may be realized by any combination of a system, a method, an integrated circuit, a computer program or a recording medium.

The converting method and a converting apparatus according to one aspect of the present disclosure are specifically described below with reference to the accompanying drawings.

Note that exemplary embodiments to be described below are specific examples of the present disclosure. Numerical values, shapes, materials, components, disposed positions and connecting forms of the components, steps and an order of steps are examples, and are not intended to limit the present disclosure. Further, some components of the components in the following exemplary embodiments that are not described in independent claims indicating a generic concept are described as optional components.

First Exemplary Embodiment

[1-1. Background]

In heightening of picture quality, emphasis has been put on an increase of pixels, and demands for a picture with Full HD (FHD: Full High definition) of 1920×1080 pixels or 2048×1080 pixels have increased. In recent years, in order to further heighten the image quality of a picture, a so-called 4 K picture of 3840×1920 or 4096×1920 pixels are started to be introduced. It is considered that the picture quality is heightened by heightening the picture resolution, widening a dynamic range, extending color gamut, or improving a frame rate.

As to the dynamic range in all of them, an attention is paid to an HDR (High Dynamic Range) as a system compatible with a luminance range where a maximum luminance value is increased in order to express bright light such as mirror reflected light that cannot be expressed by a current TV signal using more realistic brightness while dark part gradation in a conventional picture is being maintained. Specifically, the system of the luminance range compatible with a conventional TV signal is called an SDR (Standard Dynamic Range), and its maximum luminance value is 100 nit, but it is assumed that a maximum luminance value of the HDR is increased to 1000 nit or more. Standardization of the HDR in SMPTE (Society of Motion Picture & Television Engineers) or ITU-R (International Telecommunications Union Radiocommunications Sector) is now in progress. Broadcasting or a BD (Blu-ray (registered trademark) Disc) is assumed as specific application of the HDR.

[1-2. With Respect to EOTF]

The EOTF is described with reference to FIG. 1.

FIG. 1 is a diagram illustrating an example of the EOTFs (Electro-Optical Transfer Functions) compatible with the HDR and the SDR, respectively.

The EOTF is generally called a gamma curve, and indicates association between a luminance value and a code value, and is for quantizing to convert a luminance value into a code value. That is to say, the EOTF is relational information indicating the association relationships between luminance values and a plurality of code values. For example, when a luminance value of an SDR-compatible picture is expressed by a code value of 8-bit gradation, luminance values in a luminance range of up to 100 nit are quantized so as to be mapped into 256 integers from 0 to 255. That is to say, quantization based on the EOTF converts the luminance values in the luminance range of up to 100 nit (the luminance values of an SDR-compatible picture) into an SDR signal as an 8-bit code value. In an HDR-compatible EOTF (hereinafter, "HDR EOTF"), a luminance value higher than an SDR-compatible EOTF (hereinafter, "SDR EOTF") can be expressed, and in FIG. 1, for example, a maximum value of the luminance (peak luminance) is 1000 nits. That is to say, the HDR luminance range includes the entire SDR luminance range, and the HDR peak luminance is larger than SDR peak luminance. The HDR luminance range is a luminance range where the maximum value is increased from 100 nit, for example, that is the maximum value of the SDR luminance range to 1000 nit. Further, the HDR signal is expressed by, for example, 10-bit gradation.

[1-3. How to Use EOTF]

Figure 2:
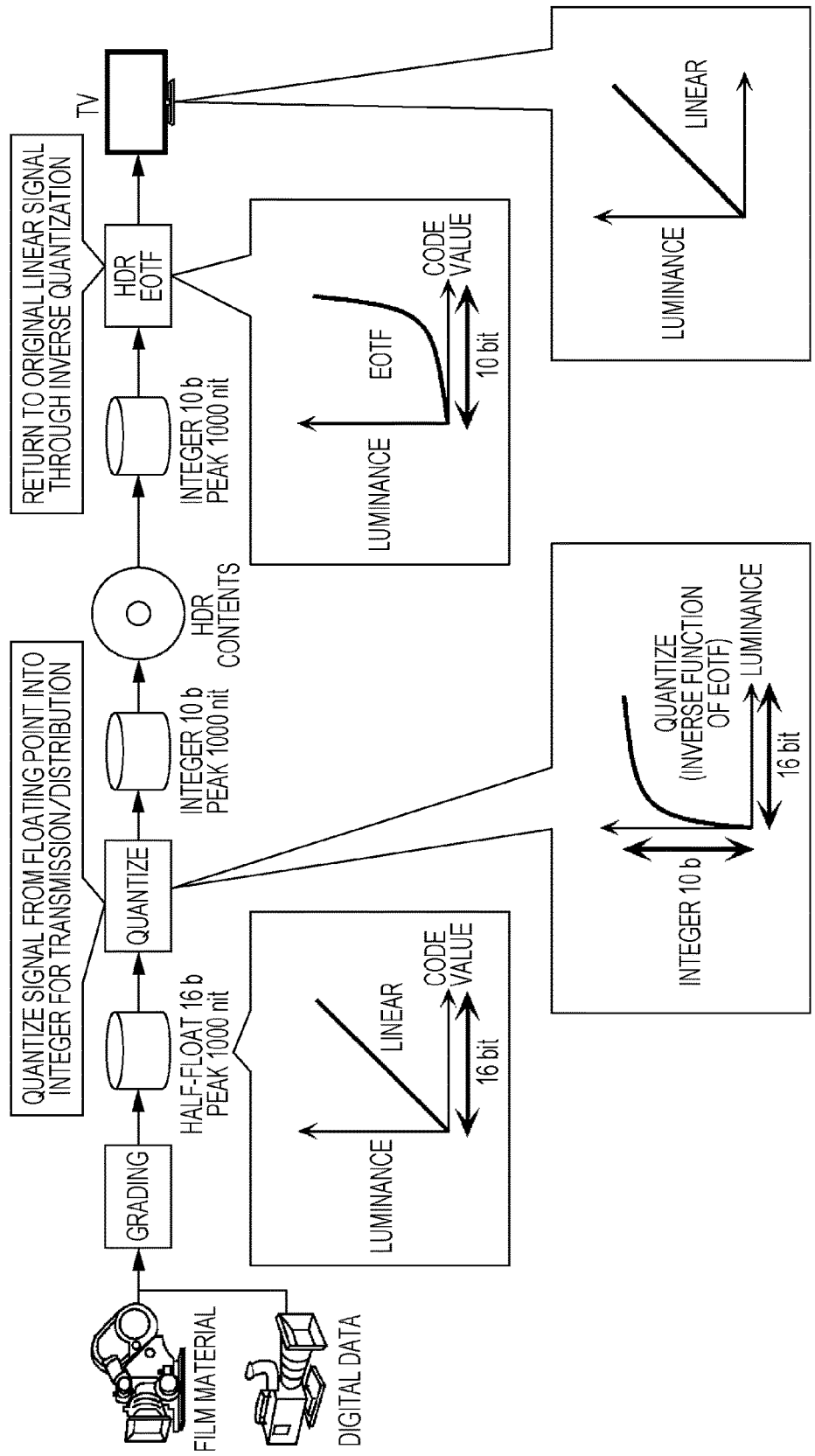
FIG. 2 is an explanatory diagram illustrating a method for deciding a code value of a luminance signal to be stored in contents and a process for restoring a luminance value from the code value at a reproduction time.

FIG. 2 is an explanatory diagram illustrating a method for deciding a code value of a luminance signal to be stored in contents and a process for restoring a luminance value from the code value at a reproduction time.

A luminance signal indicating luminance in this example is an HDR-compatible HDR signal. An image after grading is quantized by a reverse HDR EOTF, and a code value associated with a luminance value of the image is decided. The image is encoded based on this code value, and elementary streams of a video and a graphic are generated. At a time of reproduction, decoded results of the elementary streams are inversely quantized based on the HDR EOTF, and each luminance value for each pixel is restored.

[1-4. Stream Configuration of BD]

The above describes that the HDR may be used in an optical disc such as a BD, or broadcasting. A BD is described below as one example of media using the HDR with reference to FIG. 3.

Figure 3:
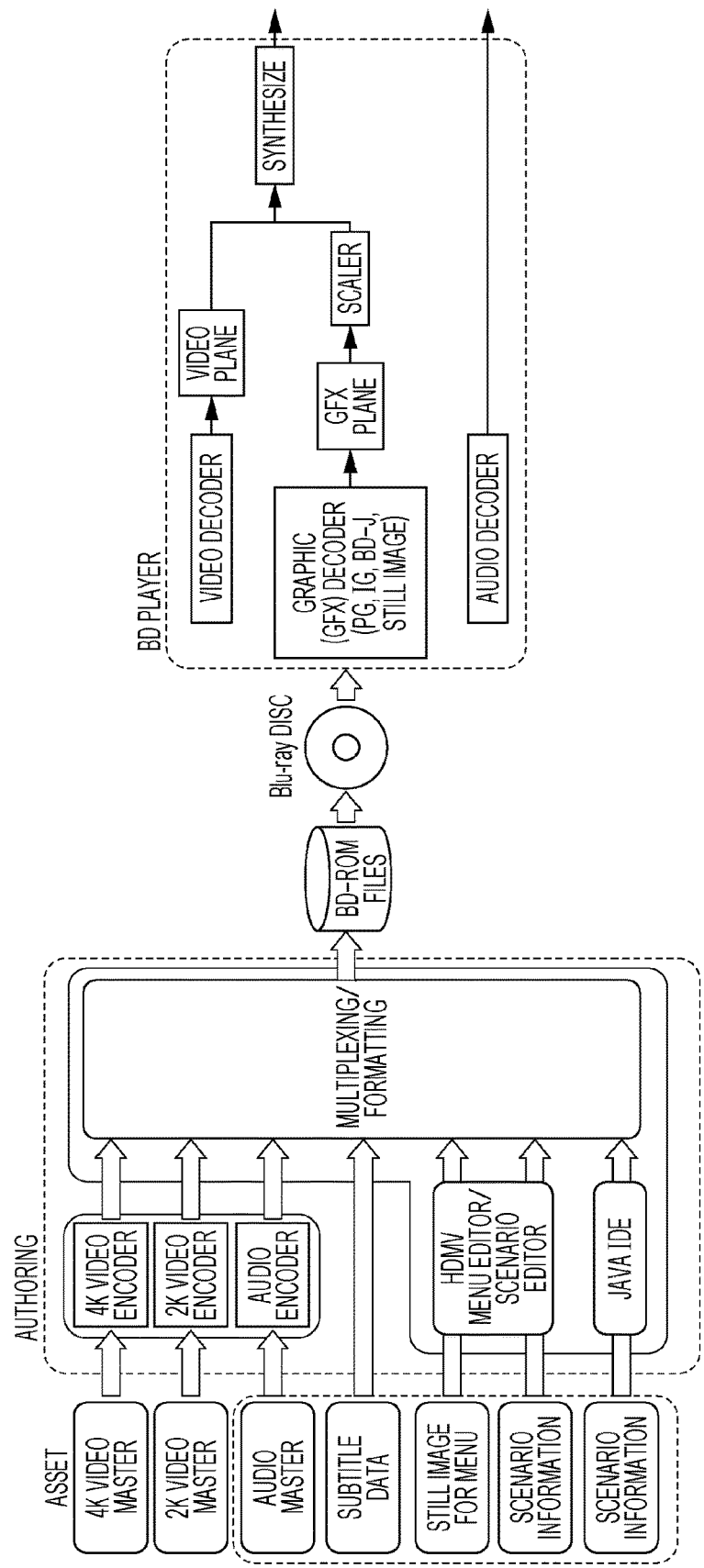
FIG. 3 is an explanatory diagram illustrating a player that creates and reproduces a BD (Blu-ray Disc)

FIG. 3 is an explanatory diagram illustrating a player for creation of a BD and reproduction from a BD.

As shown in FIG. 3, a production process includes authoring of Blu-ray (registered trademark) contents, creation of a BD storing the authored Blu-ray (registered trademark) contents. The Blu-ray (registered trademark) contents include graphic data for generating a subtitle and a menu, and scenario data for providing display of a menu and interactivity in a user's operation as well as a video and an audio. The scenario data has a format called an HDMV (High Definition Movie) for control using a prescribed command, and a format called a BD-J (Blu-ray (registered trademark)) Disc Java (registered trademark)) for control using a Java (registered trademark) program. In the authoring, a video and an audio are encoded, their encoded streams and graphic data representing a subtitle and a menu are multiplexed into a transport stream of an M2TS format. Further, management information necessary for reproduction control for a playlist and an EP map is generated. The data generated by the authoring is stored in a BD.

A BD player refers to the management information and separates elementary streams of the video and the audio necessary for reproduction from the graphic data so as to decode and output them. The video and the graphics such as the subtitle and the menu are output after a video plane and a graphics plane are synthesized. When the video is different in resolution from the graphics, the graphics are up-converted according to the resolution of the video, and the video and the graphics are synthesized.

[1-5. Configuration of Apparatus]

When contents (pictures) compatible with the HDR are reproduced, a display such as a TV receives and displays an output signal from a reproducing apparatus such as a BD player. Hereinafter, display of a picture compatible with HDR is described as "HDR display", and a display of a picture compatible with SDR is described as "SDR display". At this time, when the display is compatible with the HDR display, an output signal to be output from the reproducing apparatus may be still an HDR signal compatible with the HDR. On the other hand, when the display is not compatible with the HDR display, the reproducing apparatus converts the output signal into an SDR signal compatible with the SDR. When the display is not compatible with the HDR display, the display is compatible only with the SDR display.

Figure 4A:
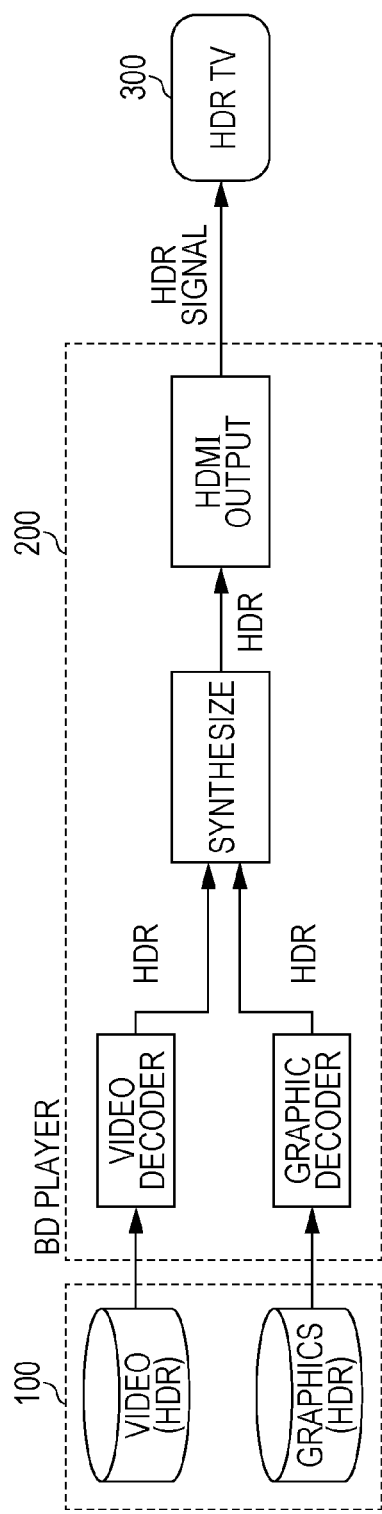
FIG. 4A is a diagram illustrating an example where a BD player and a TV are connected by an HDMI (High-Definition Multimedia Interface: registered trademark) and a case where the TV is compatible with a HDR (High Dynamic Range) display.
Figure 4B:
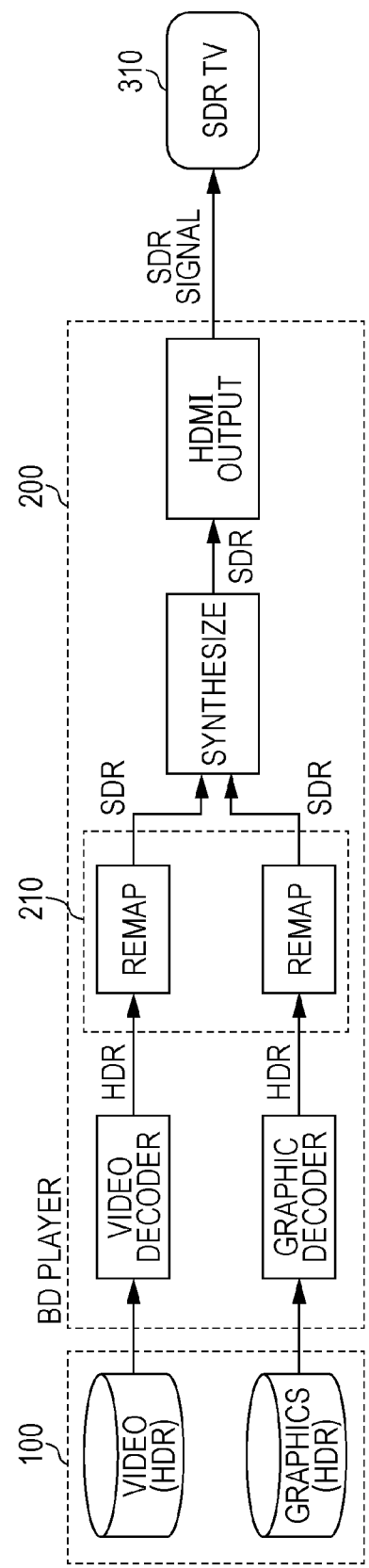
FIG. 4B is a diagram illustrating an example where the BD player and the TV are connected by the HDMI (registered trademark) and a case where the TV is not compatible with the HDR display.

FIG. 4A and FIG. 4B illustrate an example where BD player 200 and TVs 300 and 310 are connected by an HDMI (registered trademark). FIG. 4A illustrates a case where TV 300 is compatible with the HDR, and FIG. 4B illustrates a case where TV 310 is not compatible with the HDR display. BD player 200 in FIG. 4A is different in a configuration from BD player 200 in FIG. 4B, but FIG. 4A is a diagram illustrating a case where remapping, described later, is not performed and does not illustrate a configuration of converting apparatus 210 that performs remapping.

In FIG. 4A, BD player 200 reads videos and graphics from media 100 and decodes them. BD player 200 synthesizes HDR data of the decoded videos and graphics with each other, and outputs an HDR signal generated by the synthesization to HDR display-compatible TV 300 through the HDMI (registered trademark).

On the other hand, in FIG. 4B, since TV 310 is incompatible with HDR display, BD player 200 remaps the HDR data of the videos and graphics into SDR data using an HDR EOTF and an SDR EOTF before the videos and the graphics are synthesized.

BD player 200 synthesizes the SDR data of the remapped videos and graphics, and outputs an SDR signal generated by the synthesization to HDR display-incompatible TV 310 through the HDMI (registered trademark).

Incidentally, the remapping is a process for converting first code values in a first EOTF into second code values in a second EOTF when two kinds of EOTFs including the first EOTF and the second EOTF are present. In FIG. 4B, the remapping is a process for converting code values of the HDR EOTF into code values of the SDR EOTF in conversion from the HDR into the SDR.

That is to say, in FIG. 4B, BD player 200 includes converting apparatus 210 having an obtainer and a converter. The obtainer obtains a first luminance signal (the HDR signal) associated with a first luminance range (HDR). The converter decides code values associated with code values indicated by the first luminance signal obtained by the obtainer by quantization for a second luminance range (SDR) as converted code values using the HDR EOTF and the SDR EOTF, and converts the first luminance signal into a second luminance signal indicating the converted code values. More specifically, the converter decides second code values associated with the code values indicated by the first luminance signal obtained by the obtainer are decided as the converted code values using the first EOTF and the second EOTF in the conversion into the second luminance signal. BD player 200 carries out a converting method for performing steps related to respective parts of converting apparatus 210. FIG. 4B illustrates a case where converting apparatus 210 converts the HDR signal into the SDR signal so as to output the SDR signal, but the apparatus may convert the SDR signal into the HDR signal as described later.

Since luminance that exceeds 100 nit cannot be expressed in the SDR, the conversion from the HDR into the SDR performed by converting apparatus 210 needs to be performed based on a suitable process according to at least a conversion table where association between luminance that exceeds 100 nit in the HDR signal and the SDR code values associated with the luminance is defined in advance, or luminance distribution of an image in the contents. Further, in the converting method, it is assumed that different conversion rules are necessary for data where a luminance value is discrete like a subtitle, and a video. Further, since remapping is generated for each frame, a processing amount is large particularly in an image with high resolution such as 4 K. Further, since the luminance value varies before and after the remapping, an image after the remapping might be different from an image that is intended by a creator.

When an HDR signal of an HDR-compatible picture (contents) is converted into an SDR signal so as to output the SDR signal, remapping similar to the video is necessary for graphics. When the remapping is performed on both the video and the graphics, a processing amount of the remapping becomes large, and conversion into a luminance value that is not intended by a creator might be performed.

[1-6. First Remapping for Fixed Luminance Value ]

A luminance range of a graphic master is common between an SDR master and an HDR master (described later). That is to say, the graphic master is generated with an upper limit or less in the SDR luminance range. This is because a greatest effect of the HDR in picture contents is considered to be exerted on a video such as a main feature of a movie, and an effect to be exerted on the graphic such as a subtitle is smaller than the video.

In such remapping of the graphic, first remapping is performed in a manner that a luminance value associated with a code value in the first EOTF before conversion is decided, and a code value in the second EOTF after the conversion associated with the luminance value is decided. That is to say, the first remapping is performed with the luminance value being fixed in a manner that the code value in the second EOTF is decided by using the luminance value as it is, decided by the first EOTF.

A table, which represents association relationships between the plurality of code values in the respective EOTFs and the plurality of luminance values, is saved in advance. A predetermined luminance value associated with a predetermined code value is decided by referencing each table, or on the contrary, a predetermined code value associated with a predetermined luminance value is decided.

Figure 5A:
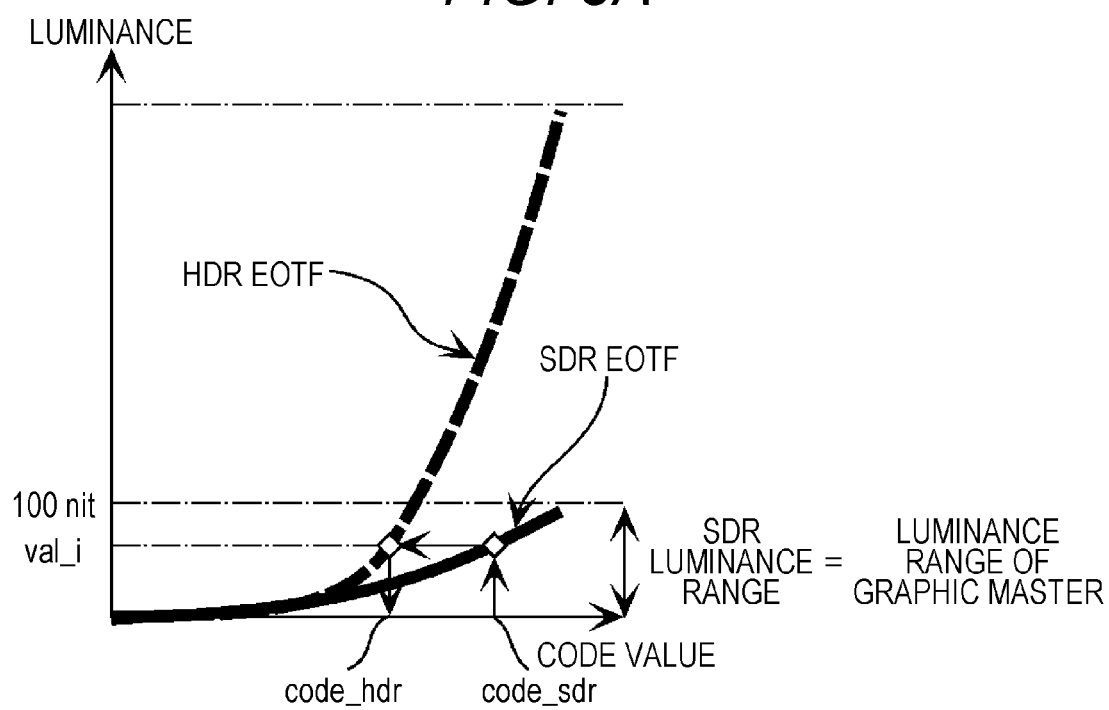
FIG. 5A is a diagram for describing an example where first remapping is carried out on an SDR signal into an HDR signal.

A specific process is described with reference to FIG. 5A and FIG. 5B. FIG. 5A is a diagram for describing an example where the first remapping from the SDR signal into the HDR signal is performed, and describing the first remapping of the SDR signal where an SDR code value is code_sdr. In the first remapping, a luminance value val_i associated with code_sdr is decided by using the SDR EOTF, and then code_hdr in the HDR EOTF associated with the decided luminance value val_i is decided. With this operation, the code value code_sdr in the SDR EOTF is remapped into the code value code_hdr in the HDR EOTF.

Figure 5B:
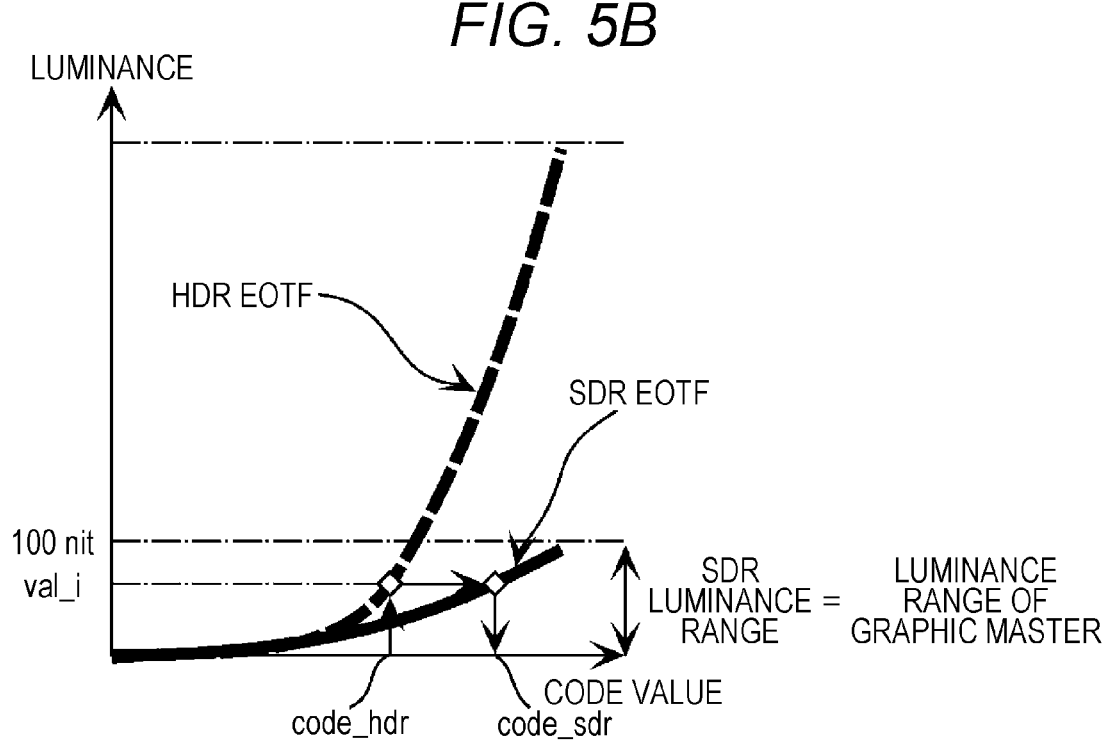
FIG. 5B is a diagram for describing an example where first remapping is carried out on an HDR signal into an SDR signal.

FIG. 5B is a diagram for describing an example of the first remapping from the HDR signal into the SDR signal, and describing remapping of the HDR signal with the code value code_hdr in the HDR EOTF similarly to the case in FIG. 5A. In the first remapping, code_hdr is remapped by the code value code_sdr in the SDR EOTF. That is to say, the luminance value val_i associated with code_hdr is decided by using the HDR EOTF, and then code_sdr in the SDR EOTF associated with the decided luminance value val_i is decided.

As a result, in the first remapping shown in FIG. 5A and FIG. 5B, (i) a luminance value associated with the code value indicated by the first luminance signal is decided by using the first EOTF, and (ii) a second code value associated with the decided luminance value in the second EOTF is decided as the converted code value.

In the first remapping, when the code value that matches with the luminance value in the first EOTF before the conversion is not present in the second EOTF after the conversion, a code value that is least different in the luminance value from the matched code value is selected from the code values in the second EOTF after the conversion. That is to say, in the first remapping shown in FIG. 5A and FIG. 5B, the code value associated with the decided luminance value is not present in the plurality of second code values associated in the second EOTF, a code value associated with a luminance value least different from the decided luminance value in the plurality of second code values is decided as the converted code value. In the example of FIG. 5A, when a code that matches with the luminance value val_i (the luminance value associated with code-sdr in the SDR EOTF) is not present in the plurality of code values in the HDR EOTF, a code value, which is associated with a luminance value closest to val_i, is selected from the plurality of luminance values associated with the plurality of code values in the HDR EOTF.

An 8-bit signal is generally used as a bit length of the code value of the SDR signal, but a bit length is assumed to be increased to 10 bits or 12 bits in the HDR signal in order to express high peak luminance. However, in a conventional authoring system, an optical disc or a BD player, since a video or graphic signal is 8 bits, an 8-bit signal is desirably used from a viewpoint of compatibility. A video is a most important element in the contents, therefore heightening of resolution from 2 K to 4 K, and widening of color gamut from ITU-R Recommendations BT.709 to BT.2020 are expected. For this reason, compatibility with the conventional systems or devices is difficult. On the other hand, a conventional graphic of 2 K, 8 bits and SDR is used, and the graphic is up-converted into 4 K when the SDR graphic is displayed, so that the graphic can be synthesized with a video to be displayed. The graphic that is the same as the conventional one enables graphic data used authoring to be shared in a picture (contents) that is a 2 K video compatible with the SDR and new contents that are a 4 K video or are compatible with the HDR.

When the display is compatible only with the SDR and uses the SDR EOTF, the SDR peak luminance can be expressed by 8 bits, and thus no problem arises. On the other hand, when the display is compatible with the HDR and uses the HDR EOTF, the bit length is increased from 8 bits to 10 bits or 12 bits in the HDR EOTF. As a result, a luminance value in the HDR EOTF associated with a code value "255" as a maximum value in 8-bit expression is occasionally smaller than the SDR peak luminance. That is to say, when values 0 to 255 are extracted from the code values in the HDR EOTF for association with the 8-bit HDR signal, the SDR peak luminance may not be expressed.

Therefore, when the HDR EOTF associated with a 10-bit code value is expressed by an 8-bit code value, a high-order 8-bit code value in the 10-bit code value in the HDR EOTF may be used. Specifically, when the 8-bit code value of the HDR signal is converted into a luminance value, the 8-bit HDR signal is shifted up by 2 bits, and 0 is inserted into a low-order 2-bit value so that a 10-bit code value is generated. A luminance value associated with the generated code value is decided.

That is to say, in the first remapping, when the code value indicated by the obtained first luminance signal is a second bit number smaller than a first bit number expressing the first code value associated in the first EOTF, a luminance value associated in the first EOTF is decided by using a bit higher by the second bit number in the first code value. Further, in the first remapping, the bit length of the first luminance signal is converted into a bit length of the first EOTF, and the luminance value associated with the code value of the converted first luminance signal is decided in the first EOTF.

The code values generated by shifting-up by 2 bits are only multiples of 4, but the SDR peak luminance can be expressed by an 8-bit code value. In another manner, when the SDR peak luminance can be expressed by a 9-bit code value, the 9-bit code value may be shifted-up by 1 bit. At this time, the shifted-up code value is a multiple of 2. Note that the similar method can be used for a case where the code value of the HDR EOTF is 12 bits.

As described above, in the first remapping, since the luminance value is fixed and the luminance value needs not to be associated between the first and second EOTFs before and after the conversion, the processing amount relating to the remapping can be reduced. Such first remapping is called luminance value fixed remapping.

[1-7. Second Remapping of Variable Luminance Value]

Figure 6:
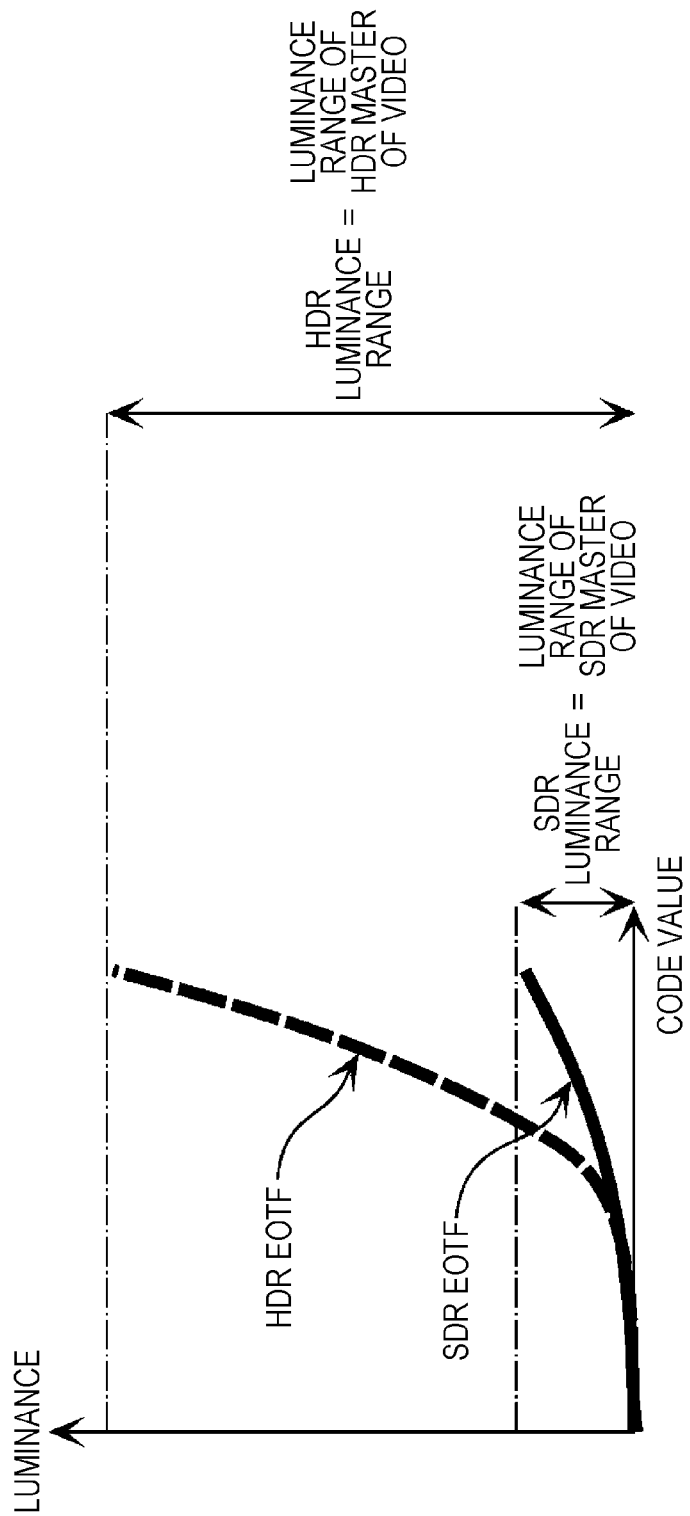
FIG. 6 is a diagram illustrating luminance ranges of an SDR master and an HDR master in a video.

The above describes that graphic is remapped from the HDR to the SDR or from the SDR to the HDR by the luminance value fixed remapping (first remapping). On the other hand, as shown in FIG. 6, since masters of different peak luminance are used for the SDR and the HDR in a video, the HDR master includes luminance that exceeds the peak luminance on the SDR. FIG. 6 is a diagram illustrating luminance ranges of the SDR master and the HDR master in a video.

In remapping of a video, since peak luminance of the HDR signal of a video is higher than peak luminance of SDR, the luminance value cannot be made to be constant before and after the conversion unlike the remapping of a graphic. For this reason, in the remapping of a video, remapping for converting the luminance value before and after the conversion (second remapping) is performed. That is to say, in the second remapping, (i) after the first luminance value associated with the code value indicated by the first luminance signal (a luminance value before the remapping) is decided by using the first EOTF, (ii) the second luminance value in the second luminance range associated with the decided first luminance value in advance (the luminance value after the remapping) is decided differently from the first remapping. In the second remapping, further similarly to the first remapping, the second code value associated with the decided second luminance value in the second EOTF is decided as the converted code value.

Figure 7:
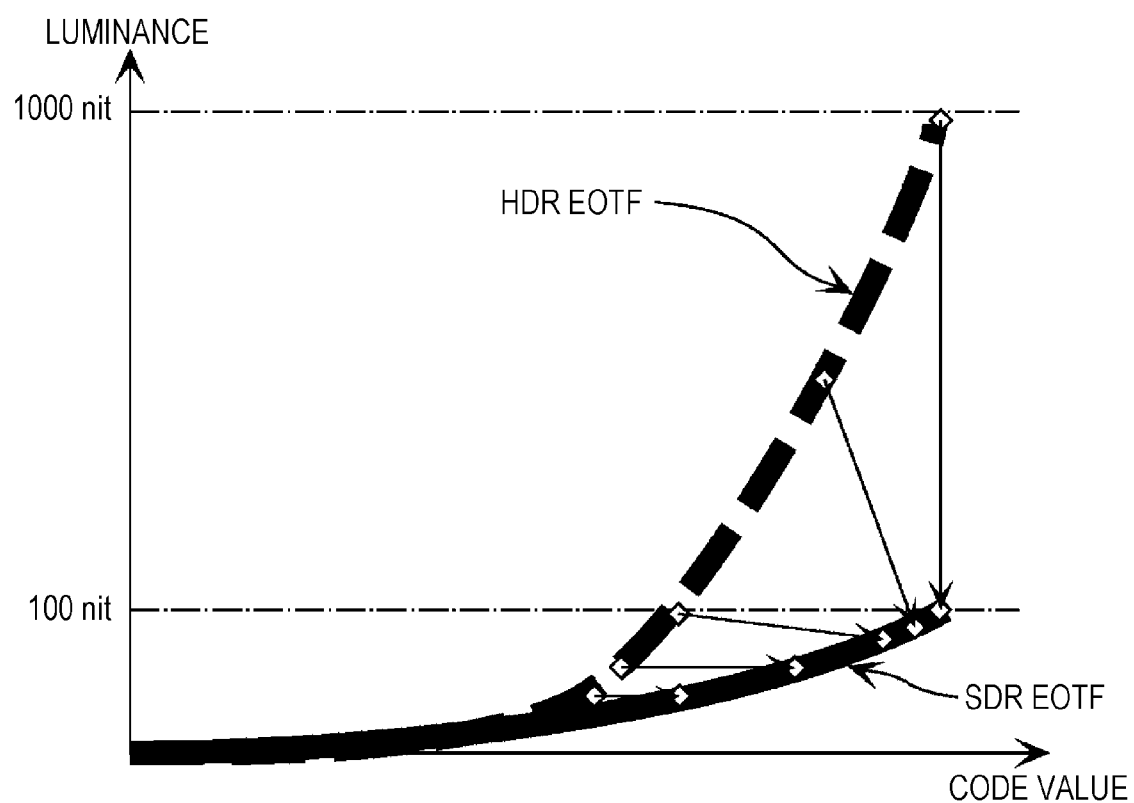
FIG. 7 is a diagram for describing an example of relational information between an HDR luminance value and an SDR luminance value when the HDR signal is converted into the SDR signal.

FIG. 7 is a diagram for describing an example of relational information about an association relationship between the HDR luminance values and the SDR luminance values when the HDR signal is converted into the SDR signal. Details of the mapping method are omitted, but in the above association relationship, mapping to luminance values in the SDR luminance range is performed so that luminance values in a low luminance region in the HDR luminance range are maintained as much as possible. Luminance values in a high luminance region higher than the low luminance region in the HDR luminance range are mapped near the peak luminance in the SDR luminance range. That is to say, as shown in FIG. 7, in the decision of the second luminance value, when the decided first luminance value is in the low luminance region where the luminance in the first luminance range is low, the second luminance value is decided so as to be approximately equal to the first luminance value. In the decision of the second luminance value, when the decided first luminance value is in the high luminance region where the luminance in the first luminance range is high, the second luminance value is decided so that as the first luminance value increases, an increasing amount reduces. When the decided first luminance value is a maximum luminance value in the first luminance range, the maximum luminance value in the second luminance range is decided as the second luminance value.

Note that luminance values that exceed the SDR peak luminance are collectively clipped so as to be matched with the SDR peak luminance. That is to say, in the decision of the second luminance value as the luminance value after the remapping, when the decided first luminance value exceeds the maximum luminance value in the second luminance range, the maximum luminance value in the second luminance range may be the second luminance value. However, such a method has a disadvantage that a luminance difference of the HDR signal in the high luminance region cannot be expressed at all. Incidentally, the association relationship between the HDR and SDR luminance values is similarly applied also to the conversion from SDR into HDR. A table is additionally prepared for the association between the HDR and SDR luminance values.

The second remapping for the case where the luminance value changes before and after the remapping is called luminance value variable remapping.

[1-8. Converting Method and Converting Apparatus ]

Figure 8:
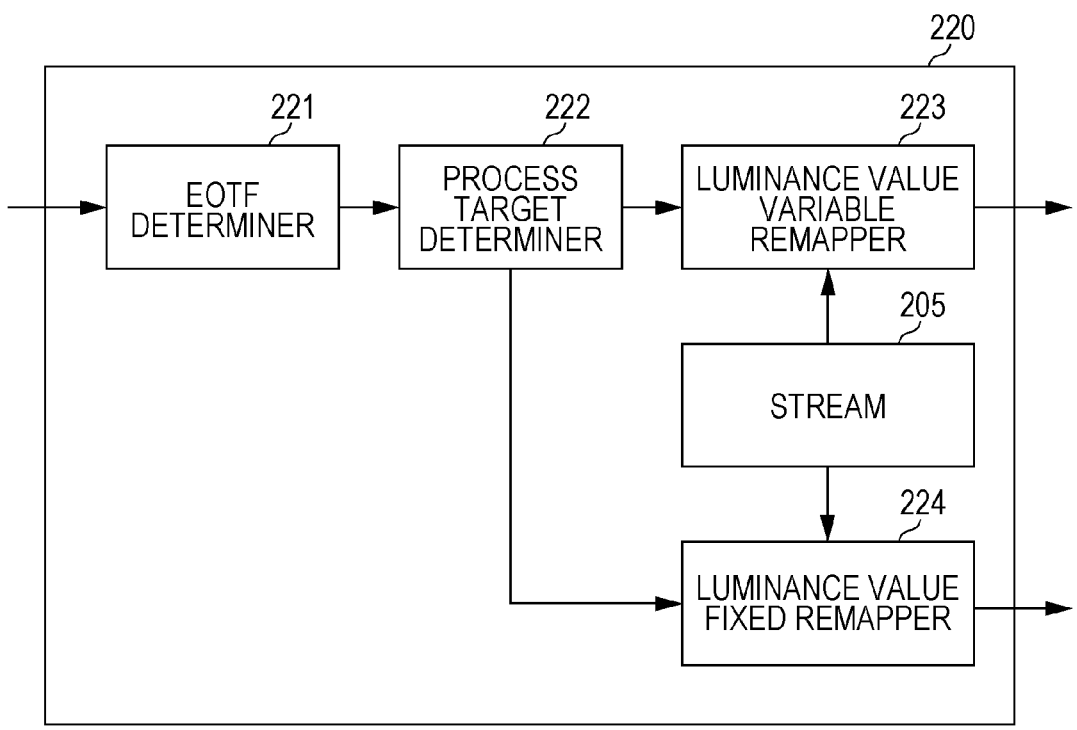
FIG. 8 is a block diagram illustrating a configuration of a remapping processor in a converting apparatus.

FIG. 8 is a block diagram illustrating a configuration of a remapping processor in a converting apparatus.

Remapping processor 220 is included in converting apparatus 210. As shown in FIG. 8, remapping processor 220 has EOTF determiner 221, process target determiner 222, luminance value variable remapper 223, and luminance value fixed remapper 224, storage 225 that temporarily stores a stream of contents (a picture).

EOTF determiner 221 determines whether the EOTF associated with a signal of contents (a video and graphics) read from media 100 is different from the EOTF associated with output signals to be output to displays of TVs 300 and 310 that display pictures. The EOTF associated with an output signal is the EOTF of an output signal that is associated with a display of TV and can be displayed on the display.

Process target determiner 222 determines whether a process target is a video (a graphic).

Luminance value variable remapper 223 converts a signal of a stream stored in storage 225 into a signal associated with the EOTF of an output signal according to the luminance value variable remapping (second remapping).

Luminance value fixed remapper 224 converts the stream signal stored in storage 225 into a signal associated with the EOTF of the output signal according to the luminance value fixed remapping (first remapping).

Figure 9:
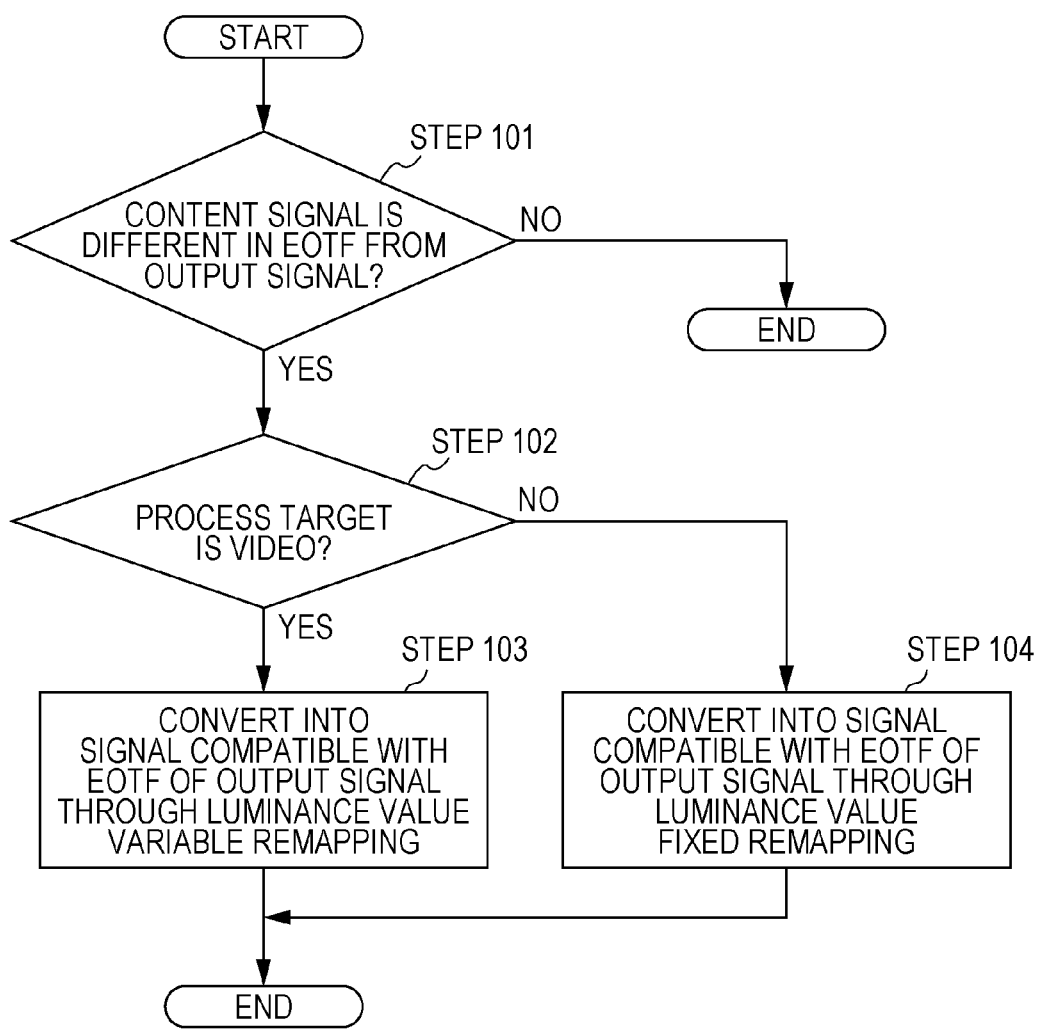
FIG. 9 is a diagram illustrating a flowchart of the remapping process in the converting apparatus.

FIG. 9 is a diagram illustrating a flowchart of a remapping process in the converting apparatus.

First, EOTF determiner 221 determines whether an EOTF associated with a signal of obtained contents (a video and a graphic) is different from an EOTF associated with an output signal to be output to a display as shown in FIG. 9 (step 101). When the determination is made as "Yes" in step 101, processes in step 102 to step 104 are executed in order to convert a system of the luminance range associated with the contents signal into the EOTF associated with the output signal. On the other hand, the determination is made as "No" in step 101, the remapping process is ended, and the contents signal is output without remapping. Step 101 is executed in such a manner so that the display such as a TV that displays a picture is decided based on compatibility with the HDR display. The format of the output signal may be decided so as to be compatible with a main video such as a main feature.

Process target determiner 222, then, determines whether a process target is a video (a graphic) (step 102). When the determination is made as "Yes" in step 102, luminance value variable remapper 223 converts the content signal into a signal compatible with the EOTF of the output signal according to the luminance value variable remapping (the second remapping) (step 103).

On the other hand, when the determination is made as "No" in step 102, luminance value fixed remapper 224 converts the contents signal into a signal compatible with the EOTF of the output signal according to the luminance value fixed remapping (the first remapping) (step 104).

When the content (the picture) is a video, the second remapping is performed, and when the content (the picture) is a graphic, the first remapping is performed.

In the luminance value variable remapping in step 103 and the luminance value fixed remapping in step 104, tables that indicate an association relationship between the HDR and SDR luminance values are prepared in advance respectively. The association relationship between the luminance values with the code values in the HDR EOTF and the SDR EOTF may be described in each of the tables. As a result, the code values that are associated with the luminance values of the EOTF after the remapping are always present. For this reason, when a code value that is associated with a luminance value is not present, a code value having a luminance value closest to that luminance value needs not to be searched for.

Further, in the luminance value variable remapping (the second remapping), a plurality of tables may be adaptively switched based on a luminance distribution in an image or in each scene or an optimum table may be sequentially created for each content. That is to say, for example, in decision of the second luminance value that is the luminance value after the remapping, relational information according to a picture scene is selected from a plurality of pieces of relational information (tables) representing a relationship between the luminance values in the first luminance range and the luminance values in the second luminance expression. Then the second luminance value may be decided based on the decided first luminance value by using the selected relational information.

In the luminance value variable remapping in step103, the process is executed in the following procedure. In this case, the conversion is performed from the first luminance signal associated with the first EOTF into the second luminance signal associated with the second EOTF.

(1) The first luminance value associated with the code value of the first EOTF (the luminance value before the remapping) is decided.

(2) The second luminance value of the second EOTF associated with the first luminance value decided in (1) (the luminance value after the remapping) is decided.

(3) A code value of the second EOTF associated with the second luminance value decided in (2) is decided.

In the luminance value fixed remapping in step 104, the process is executed in the following procedure. In this case, the conversion is performed from the first luminance signal associated with the first EOTF into the second luminance signal associated with the second EOTF.

(1) The luminance value associated with the code value of the first EOTF is decided.

(2) (1) The code value of the second EOTF associated with the luminance value decided in (1) is decided.

* In the luminance value fixed remapping, since the luminance value does not change before and after the remapping, the process (2) in step 103 is not necessary.

After the completion of step 103 and step 104 in the remapping process, converting apparatus 210 synthesizes the video and the graphic so as to output them. That is to say, converting apparatus 210 may further perform the first remapping and the second remapping so as to synthesize and output the video and the graphic that are converted into the second luminance signal.

Further, when outputting the signal to the display through an interface such as an HDMI (registered trademark), converting apparatus 210 may transmit information for identifying the EOTF of the output signal as meta-information. That is to say, converting apparatus 210 may further output the second luminance signal obtained by converting the obtained first luminance signal as well as the meta-information for identifying the second EOTF.

[1-9. Effects]

In the first exemplary embodiment, in the reproduction of contents, a decision is made whether an HDR signal or an SDR signal is output according to compatibility of an output destination of a picture with the HDR or the SDR. The process for remapping the picture and the graphic from the SDR to the HDR or from the HDR to the SDR is executed according to the output format. A luminance value fixed remapping process where the luminance value does not change before and after the remapping is applied to the graphic, and a luminance value variable remapping process where the luminance value might be changed before and after the remapping is applied to the picture.

Since the luminance of the graphic does not change before and after the remapping, image quality intended by a creator can be maintained. Further, the luminance values need not to be associated between the EOTFs before and after the conversion, and thus the processing amount for the remapping can be reduced.

Second Exemplary Embodiment

[2-1. Contents Creating Method]

The creation of a video master and a graphic master needs a grading step shown in FIG. 2. In this step, luminance and color shade of a digital image imaged by a camera or a scanned image of a film are corrected in each pixel so that creator's intention is reflected. The grading requires advanced know-how, and a great number of necessary steps. Therefore, it is desirable to minimize a number of masters to be created as small as possible. On the other hand, since the peak luminance is different between the HDR and the SDR, different masters need to be generally created for the HDR and the SDR respectively. FIG. 10 is a diagram illustrating an example of combinations of the HDR and the SDR when contents include one video stream and one graphic stream. In this example, four combinations are present, and the HDR master and the SDR master are necessary for a video and a graphic.

On the other hand, a greatest effect of the HDR in picture contents is considered to be exerted on a video such as a main feature of a movie, and an effect to be exerted on graphic such as a subtitle is smaller than the effect on the video. Nevertheless, when the HDR master and the SDR master are created also for the graphic similarly to the video, a load on the creation of contents is large.

Therefore, in the creation of the graphic master in the present disclosure, a master is shared in the SDR and the HDR as shown in FIG. 11. FIG. 11 is a diagram illustrating that a graphic master is created by using an EOTF shared with a video master. A luminance range in the graphic master is made to match with an SDR luminance range. That is to say, peak luminance in the graphic master is an upper limit value of the SDR luminance range or less. When graphic data in the contents is mapped into an SDR signal compatible with SDR, code values for respective pixels are decided based on the SDR EOTF. When the graphic data is mapped into an HDR signal compatible with the HDR, code values for respective pixels are decided based on the HDR EOTF.

Figure 12A:
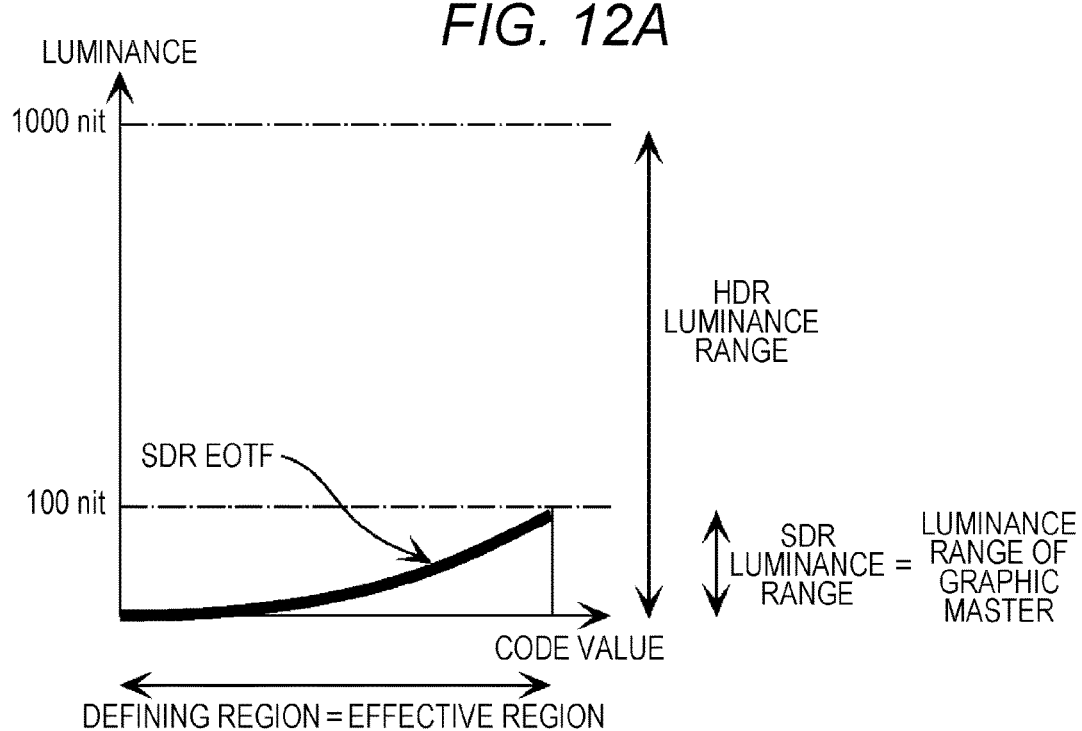
FIG. 12A is a diagram for describing a case of mapping on the SDR signal when the graphic master is created.

FIG. 12A is a diagram for describing a case of mapping on the SDR signal when the graphic master is created. In this case, since the SDR luminance range matches with the luminance range of the graphic master, a defining region of the code value in the SDR EOTF is entirely effective.

Figure 12B:
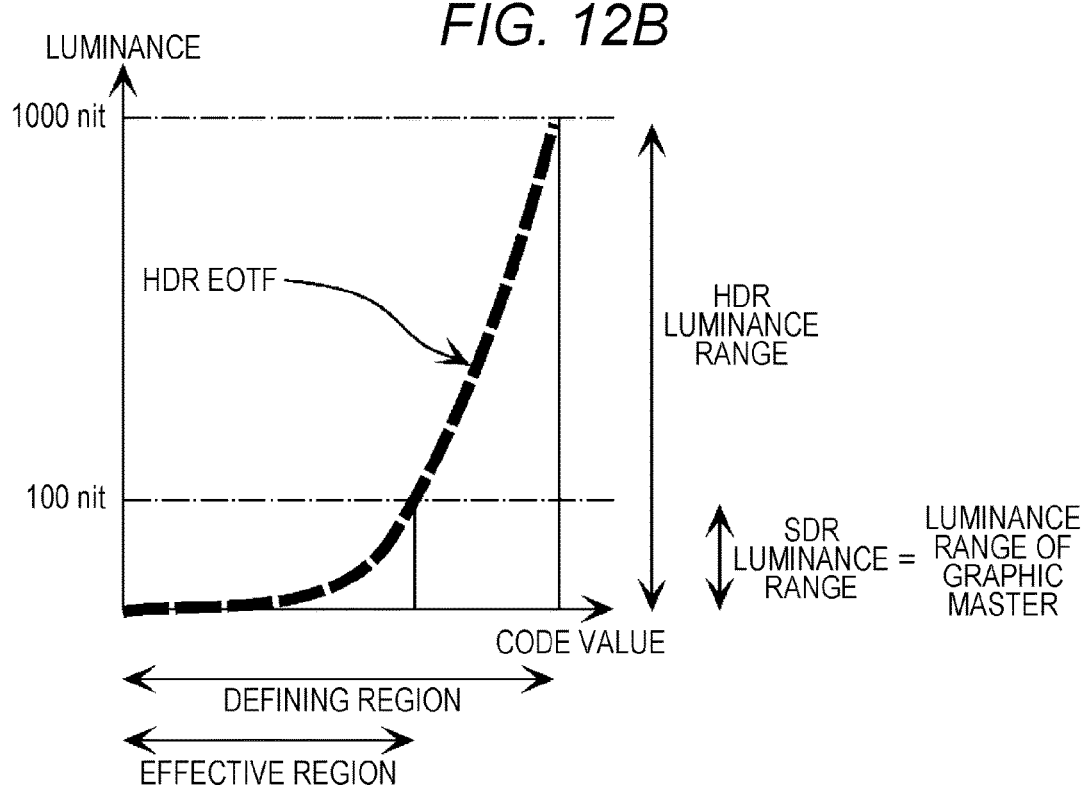
FIG. 12B is a diagram for describing a case of mapping on the HDR signal when the graphic master is created.

FIG. 12B is a diagram for describing a case of mapping on the HDR signal when the graphic master is created. In this case, only code values that are the code value corresponding to the peak luminance of SDR or less are effective.

Incidentally, when the graphic master is mapped into the HDR signal, identification information representing that the peak luminance is within the SDR luminance range may be stored in an elementary stream or management information such as a playlist. In the above remapping process, a decision can be made based on the identification information which of luminance value fixed remapping or luminance value variable remapping is applied. Further, when output is carried out by an interface such as HDMI (registered trademark), the identification information may be stored as meta-information of the output interface.

An EOTF of the graphic can be decided according to a video. That is to say, when the video is an HDR video, the graphic data is also HDR data, and when the video is an SDR video, the graphics data is also SDR data. In another manner, the graphic data may be always an SDR data.

Note that the similar consideration can be applied also to a case where a plurality of videos is present. For example, when a sub-video that is displayed with it being overlapped on a main video or in parallel with the main video, an EOTF of the sub-video can be matched with an EOTF of the main video.

[2-2. Data Creating Method and Apparatus]

Figure 13:
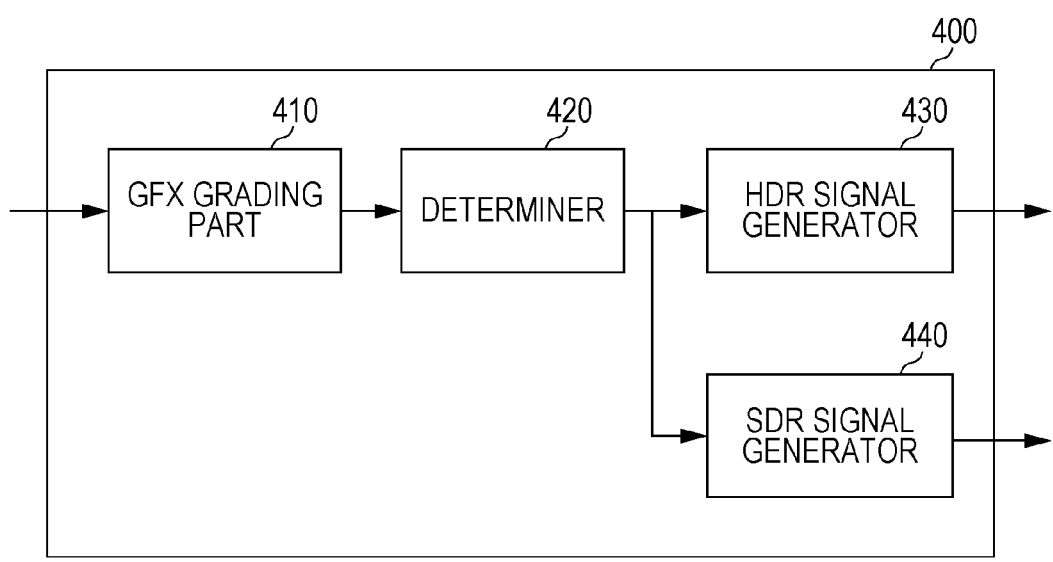
FIG. 13 is a block diagram illustrating a configuration of a generator that generates a graphic signal on authoring.

FIG. 13 is a block diagram illustrating a configuration of a generator that generates a graphic signal on authoring.

Generator 400 includes GFX (graphic effect) grading part 410, determiner 420, HDR signal generator 430, and SDR signal generator 440.

GFX grading part 410 grades a graphic master so that the luminance value is the SDR peak luminance or less.

Determiner 420 determines whether a video to be displayed together with a graphic is an HDR video.

When determiner 420 determines that the video to be displayed simultaneously with the graphic is an HDR video, HDR signal generator 430 converts a luminance value of the graphic into a code value using the HDR EOTF.

When determiner 420 determines that the video to be displayed simultaneously with the graphic is not an HDR video (namely an SDR video), SDR signal generator 440 converts the luminance value of the graphic into a code value using the SDR EOTF.

Figure 14:
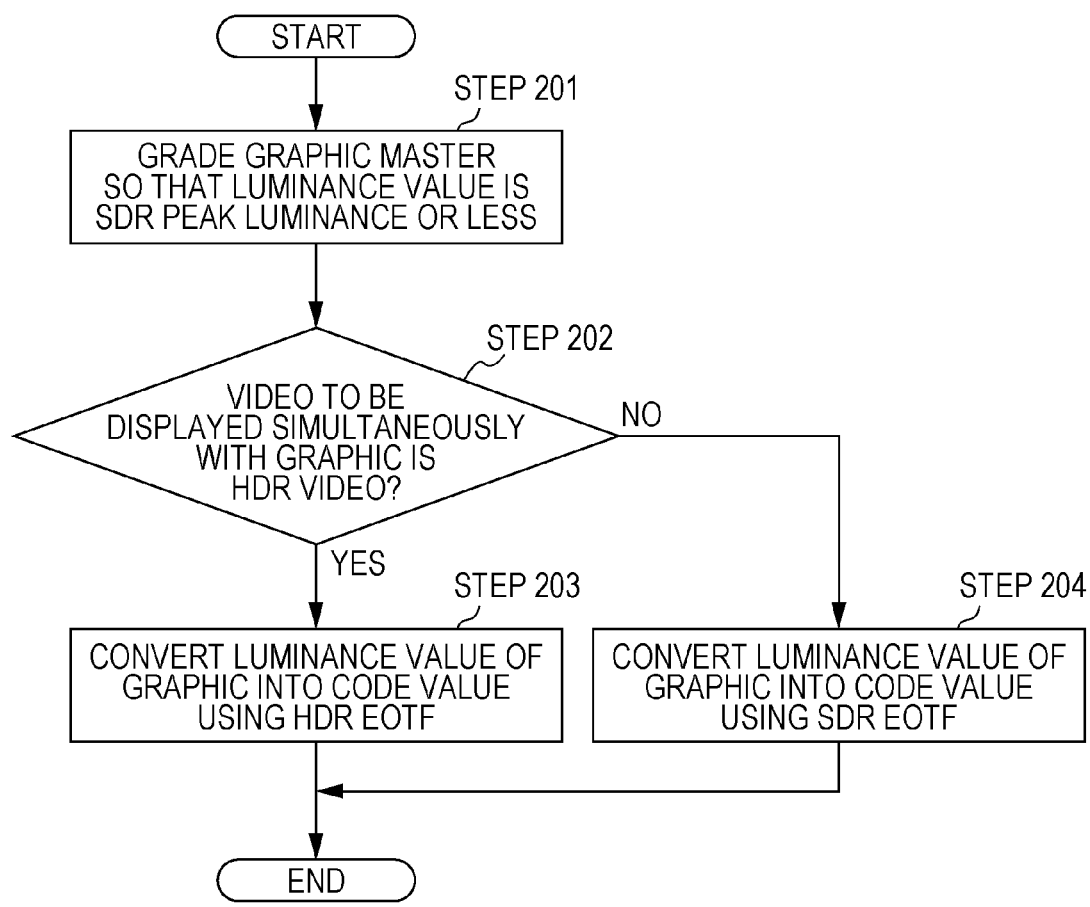
FIG. 14 is a flowchart illustrating a method for generating the graphic signal in authoring.

FIG. 14 is a flowchart illustrating a method for generating the graphic signal on authoring.

First, GFX grading part 410 grades a graphic master so that the luminance value becomes the SDR peak luminance or less (step 201).

Determiner 420 determines whether the video to be displayed simultaneously with the graphic is an HDR video (step 202).

When the determination is made as "Yes" in step 202, HDR signal generator 430 converts the luminance value of the graphic into a code value using the HDR EOTF (step 203).

When the determination is made as "No" in step 202, SDR signal generator 440 converts the luminance value of the graphic into a code value using the SDR EOTF (step 204).

Note that the determination is made in step 202 whether the graphic is displayed simultaneously with the video. At this time, when the graphic is, for example, a subtitle, the video on which the subtitle is superimposed is determined. Further, the graphic such as a menu that is not displayed simultaneously with the video may be determined based on whether a main feature of the video is an HDR video. Furthermore, since the graphic uses a format for conventional 2 K, the graphic is converted always using the SDR EOTF. Therefore, the determining process in step 202 is not executed, and the process in step 204 may be always executed.

In such a manner, the luminance range of the graphic is set to be the SDR peak luminance or less, so that the luminance value fixed remapping can be performed without changing the luminance value before and after the remapping.

Note that the grading can be carried out also on data other than graphic so that the luminance of the HDR master is within the SDR range. Particular, in a graphic such as a subtitle, a merit of using a luminance value higher than the SDR peak luminance is insignificant. Therefore, the luminance value fixed remapping may be applied to the remapping from the SDR to the HDR regardless of whether the grading is within the SDR range.

[2-3. Effects and the Like ]

In the creating apparatus and the creating method according to the second exemplary embodiment, when a content that includes picture data such as a graphic as well as a video is authored, a common master is used for the picture data other than the video in the HDR and the SDR. For this reason, grading is carried out so that the peak luminance in a master is within the SDR luminance range.

As a result, since the master excluding the video can be commonized in the HDR and the SDR, a number of steps relating to the creation of a master can be reduced.

Another Exemplary Embodiment

The exemplary embodiments are described above as the examples of the technique disclosed in the present application. However, the technique of the present disclosure is not limited to them, and thus can be applied to an exemplary embodiment where modification, replacement, addition or omission is suitably made. Further, the components described in the exemplary embodiments are combined so as to provide a new exemplary embodiment.

Therefore, another exemplary embodiment is described below.

For example, in the above exemplary embodiments, two kinds of formats that are the HDR and the SDR are described as a format of the output signal to be output from converting apparatus 210. At a time of output into the HDMI (registered trademark), output is carried out in the HDR or the SDR as a standard specification. For example, when a TV is provided with a built-in BD player or broadcasting is received and reproduced by the TV, or an OTT service is viewed on a tablet, a signal can be directly output from converting apparatus 210 into a display device.

At this time, in a case where the peak luminance in an HDR standard is different from the displayable peak luminance on the display device, a remapping process may be executed on data in a content compatible with the HDR according to the EOTF of the display device. Further, the remapping process may be again executed on SDR and HDR signals input into the display device by the HDMI (registered trademark) for the EOTF according to the peak luminance of the display device.

That is to say, in this case, the obtained first luminance signal may be converted into a second luminance signal by using the first EOTF, and the second EOTF where the displayable luminance range on the display device as an output destination of the second luminance signal is a second luminance range.

Further, in the exemplary embodiments, not described, but in authoring of a BD, a video and an audio to be reproduced by unit of a play item in a playlist, or a graphic can be specified. When a video and an audio to be reproduced in units of play items, or a graphic are specified, the resetting process is executed on a boundary of play items by switching between the HDR and the SDR in units of play items in the interface such as the HDMI (registered trademark). As a result, seamless reproduction cannot be occasionally carried out. Therefore, when the switching between the HDR and the SDR is performed between play items that are seamlessly connected, the remapping process may be executed in the converting apparatus provided to the BD player so that the EOTF of an output signal is the same as the EOTF of the previous play item. In another manner, the switching of the EOTF is prohibited between the play items that are seamlessly connected, and identification information that represents that the EOTF is not switched may be stored in management information such as the playlist.

Further, the authoring or the converting method in the exemplary embodiments can be applied not only to package media such as optical discs but also to broadcasting and an OTT (Over The Top) service. For example, in broadcasting, besides a main feature of a broadcasting program, data broadcasting to be transmitted by broadcasting, and a content obtained via a communication network can be superimposed on a main feature of a video to be displayed. At this time, it is expected that an HDR program and an SDR program are mixed in a main feature of a video. A restriction of the peak luminance and the remapping process can be carried out also on a graphic and a video in a content obtained separately from the main feature by the above-described method.

Figure 15:
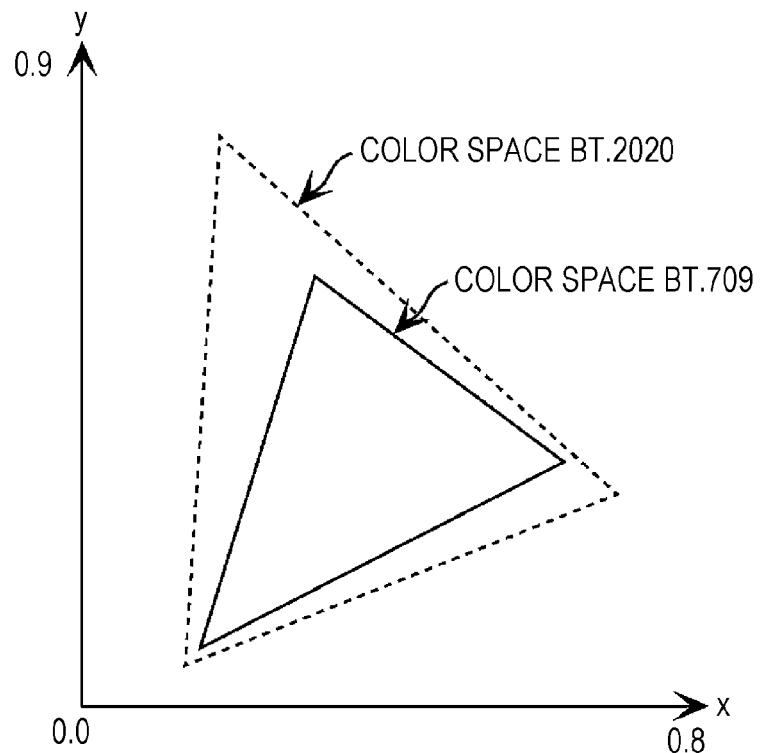
FIG. 15 is a diagram in which color spaces BT.709 and BT.709 in ITU-R Recommendations are indicated by a CIE (Commission International de l'Eclairage) color system.

Further, the exemplary embodiments describe the HDR and SDR EOTFs with different peak luminance. This idea can be similarly applied also to color gamut and bit depth. The color gamut is changed from a color space BT.709 into a color space BT.2020 according to heightening of resolution from 2 K to 4 K. FIG. 15 is a diagram in which the color spaces BT.709 and BT.709 in ITU-R Recommendations are indicated by a CIE color system, and it is found that color gamut is wider in BT.2020 than BT.709. In a graphic, like a case where the peak luminance of the HDR signal is made to be matched with the peak luminance of the SDR signal, when the color space BT.2020 is used, colors within a range of the color gamut of BT.709 can be used. Information representing whether the colors are within the range of BT.709 when BT.2020 is used as the color space can be stored as meta-information in the content or of the output interface similarly to the EOTF.

Note that in the above exemplary embodiments, the respective components may be configured by dedicated hardware, or may be realized by executing software programs suitable for the respective components. The respective components may be realized by a such a manner that a program executer such as a CPU or a processor reads software programs recorded in a hard disc or a recording medium such as a semiconductor memory so as to execute the programs.

The converting method and the converting apparatus according to one or some of the aspects of the present disclosure are described above in the exemplary embodiments, but the present disclosure is not limited to the exemplary embodiments. Exemplary embodiments obtained by making various modifications, which are conceived by the person skilled in the art, and exemplary embodiments obtained by combining the components in different exemplary embodiments may be included in a scope of one or some of the aspects of the present disclosure without departing from the scope of the present disclosure.

The present disclosure is useful as the converting method and the converting apparatus that can suitably convert luminance from a first luminance range to a second luminance range that is made wider or narrower than the first luminance range.

What is claimed is:

1. A method for converting luminance of an image comprising:
   obtaining a first luminance signal which is a luminance signal of the image;
   converting a first code value included in the first luminance signal into a first luminance value using a first Electro-Optical Transfer Function (EOTF) that indicates a relationship between a luminance value in a first luminance range and a code value;
   converting the first luminance value into a second luminance value associated with the first luminance value in advance;
   converting the second luminance value into a second code value using a second EOTF that indicates a relationship between a luminance value in a second luminance range different in a maximum value from the first luminance range and a code value;
   outputting a second luminance signal including the second code value.

2. The method according to claim 1, wherein
   when the first luminance value is in a low luminance region of the first luminance range, the first luminance value is converted into the second luminance value whose luminance value is approximately equal to the first luminance value;
   when the first luminance value is in a high luminance region of the first luminance range, the first luminance value is converted into the second luminance value so that the larger the first luminance value is, the smaller an increase amount of the luminance value is.

3. The method according to claim 1, wherein
   when the first luminance value exceeds a maximum luminance value in the second luminance range, the first luminance value is converted into the second luminance value which is the maximum luminance value in the second luminance range.

4. The method according to claim 1, further comprising deciding a conversion method from the first luminance value into the second luminance value according to a scene of the image.

5. An apparatus for converting luminance of an image, comprising:
   an obtainer for obtaining a first luminance signal which is a luminance signal of the image;
   a converter for
   (i) converting a first code value included in the first luminance signal into a first luminance value using a first Electro-Optical Transfer Function (EOTF) that indicates a relationship between a luminance value in a first luminance range and a code value;
   (ii) converting the first luminance value into a second luminance value associated with the first luminance value in advance; and
   (iii) converting the second luminance value into a second code value using a second EOTF that indicates a relationship between a luminance value in a second luminance range different in a maximum value from the first luminance range and a code value; and
   an output unit for outputting a second luminance signal including the second code value.

6. An apparatus according to claim 5, wherein
   when the first luminance value is in a low luminance region of the first luminance range, the converter converts the first luminance value into the second luminance value whose luminance value is approximately equal to the first luminance value;
   when the first luminance value is in a high luminance region of the first luminance range, the converter converts the first luminance value the second luminance value so that the larger the first luminance value is, the smaller an increase amount of the luminance value is.

7. An apparatus according to claim 5, wherein
   when the first luminance value exceeds a maximum luminance value in the second luminance range, the converter converts the first luminance value into the second luminance value which is the maximum luminance value in the second luminance range.

8. An apparatus according to claim 5, wherein
   the converter decides a conversion method from the first luminance value into the second luminance value according to a scene of the image.

9. An image display apparatus comprising:
   the apparatus according to claim 5;
   a display device for displaying the image based on the second luminance signal.

10. An apparatus for converting luminance of an image, comprising:
    a processor; and
    a memory including at least one set of instructions that, when executed by the processor, cause the processor to perform operations including:
    obtaining a first luminance signal which is a luminance signal of the image;
    converting a first code value included in the first luminance signal into a first luminance value using a first Electro-Optical Transfer Function (EOTF) that indicates a relationship between a luminance value in a first luminance range and a code value;
    converting the first luminance value into a second luminance value associated with the first luminance value in advance;
    converting the second luminance value into a second code value using a second EOTF that indicates a relationship between a luminance value in a second luminance range different in a maximum value from the first luminance range and a code value;
    outputting a second luminance signal including the second code value.

* * * * *